United States Patent [19]

Izume et al.

[11] 4,419,559

[45] Dec. 6, 1983

[54] RESISTIVE WELDER HAVING A CONTROLLED OUTPUT VOLTAGE UNAFFECTED BY SECONDARY CIRCUIT DISCONNECTION

[75] Inventors: Takatomo Izume, Urawa; Chihiro Okado, Fuchu, both of Japan

[73] Assignee: Tokyo Shibaura Denki Kabushiki Kaisha, Kawasaki, Japan

[21] Appl. No.: 305,223

[22] Filed: Sep. 24, 1981

[30] Foreign Application Priority Data

Oct. 7, 1980 [JP] Japan ................................. 55-140303

[51] Int. Cl.³ .......................................... B23K 11/24
[52] U.S. Cl. .................................... 219/110; 219/114
[58] Field of Search ............... 219/108, 109, 110, 114

[56] References Cited

U.S. PATENT DOCUMENTS

| 3,921,058 | 11/1975 | Tanaka et al. | 219/108 |
| 4,076,974 | 2/1978 | Gee | 219/114 |
| 4,289,948 | 9/1981 | Jurek et al. | 219/110 |

FOREIGN PATENT DOCUMENTS

54-45650  4/1979  Japan .

*Primary Examiner*—C. C. Shaw
*Attorney, Agent, or Firm*—Oblon, Fisher, Spivak, McClelland & Maier

[57] ABSTRACT

A resistance welder is provided having an electronic contactor, a welding transformer coupled in series with the electronic contactor, and a secondary circuit with a welding load connected to the welding transformer. The series circuit of the electronic contactor and the welding transformer is adapted for receiving power from an AC power source. The resistance welder also includes a control device having a voltage detector coupled to detect a voltage across the electronic contactor for producing a first signal according to the detected voltage, a delay circuit coupled to receive a primary voltage across the welding transformer for delaying the primary voltage by a value determined by a first time constant thereof to produce a voltage signal, a switch coupled to receive the first signal for resetting the delay circuit according to the first signal, and a gain control circuit coupled to receive the voltage signal for controlling a transmission gain of the voltage signal to produce a gain controlled signal. The control device further includes a processor coupled to receive the gain controlled signal for comparing the gain controlled signal with a predetermined reference value and for producing a gate control signal based on a comparison result. The electronic contactor is also coupled to receive the gate control signal for controlling the primary voltage so that said primary voltage becomes equal to a predetermined value corresponding to the predetermined reference value.

24 Claims, 5 Drawing Figures

RESISTIVE WELDER HAVING A CONTROLLED OUTPUT VOLTAGE UNAFFECTED BY SECONDARY CIRCUIT DISCONNECTION

BACKGROUND OF THE INVENTION

1. Field of the Invention

This invention relates, in general, to a novel resistance welder and a novel control device for the resistance welder.

2. Description of the Prior Art

A resistance welder is a well known device wherein two or more sheets of metal to be welded are put between electrodes which apply pressure to the sheets. A current of several thousand through ten thousand or more amperes is caused to flow in the metal sheets through the electrodes in order to melt and weld the metal sheets by Joule heating due to the current flowing in the metal sheets. A control device in the resistance welder controls the effective value of the current, the weld time, and the duration of the time for applying pressure to the sheets.

Figure 1:
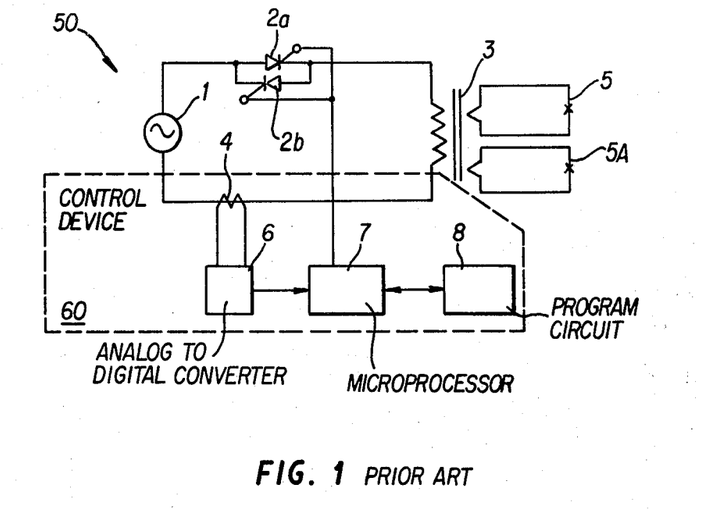
FIG. 1 is a circuit diagram of a conventional resistance welder.

FIG. 1 is a circuit diagram of a conventional resistance welder. In FIG. 1 numeral 1 designates an AC power source. The resistance welder 50 includes a pair of anti-parallel connected electronic contactors, such as the thyristors 2a and 2b, a welding transformer 3, and secondary circuits 5 and 5A of the welding transformer 3. The resistance welder 50 also includes a control device 60 which includes a current transformer 4, an analog to digital converter 6 (hereinafter referred to as an A/D converter), a microprocessor 7, and a program circuit 8.

The AC power source 1 supplies an AC power of, for example, 400 V or 440 V, 50 Hz or 60 Hz, to the welding transformer 3 through the thyristors 2a and 2b. When a current flowing through the primary winding of the welding transformer 3 is I amperes and the winding ratio of the transformer is n:1, the total current flowing through the secondary circuits 5 and 5A is n×I amperes. The program circuit 8 is a device for setting reference effective values of the current flowing through the secondary circuits 5 and 5A, respectively, and for setting the weld time. The set values in the program circuit 8 are applied to the microprocessor 7 and are stored in a main memory (not shown) of the microprocessor 7. The microprocessor 7 calculates the primary current I of the welding transformer 3 based on the data stored in the main memory and determines a firing angle for the thyristors 2a and 2b.

Figure 2:
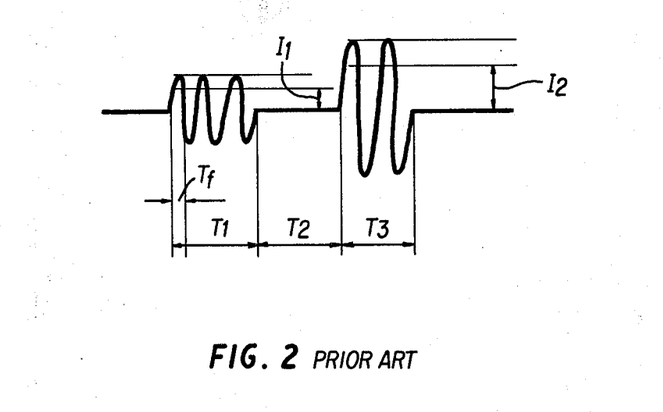
FIG. 2 is a waveform of the secondary current set in the program circuit in FIG. 1.

Hereinafter the operation of the control device 60 of the resistance welder 50 will be described in more detail. FIG. 2 shows a flowing condition of the secondary current. It is shown in FIG. 2 that a current of an effective value $I_1$ flows through the secondary circuits 5 and 5A during the $T_1$ cycle, that no current flows during the $T_2$ cycle which is provided for cooling, and that a current of an effective value $I_2$ flows through the secondary circuits 5 and 5A during the $T_3$ cycle, respectively. The program circuit 8 can set the effective values $I_1$ and $I_2$ of the current and the length of the cycle periods $T_1$, $T_2$ and $T_3$. The primary current I flowing through the welding transformer 3 is detected by the current transformer 4 and is converted into a digital value in the A/D converter 6 thereby being fed back to the microprocessor 7. The microprocessor 7 compares digitally the current thus fed back with the reference value previously stored in the main memory, and controls the firing angle of the thyristors 2a and 2b to make the fed back current equal to the reference value based on the comparison result at every cycle of the AC power source 1. During the cooling time $T_2$ shown in FIG. 2 or when the thyristors 2a and 2b are in the off state, no firing pulse signal is applied to the thyristors 2a and 2b by the microprocessor 7. This control technique is well known to those skilled in the art, therefore a detailed description thereof is neglected.

Since the fed back current I is an instantaneous value and the reference value is given in terms of an effective value, the microprocessor 7 is required to convert the instantaneous value of the fed back current I into an effective value. The microprocessor 7 reads the fed back current I at a predetermined sampling rate (usually between 100 μS and 200 μS) and calculates the effective value as follows:

$$I_{eff} = \sqrt{\sum_{k=0}^{k=n} I_k^2/n}$$

where,

Ieff: an effective value of the fed back current I,

Ik: an instantaneous value of the fed back current I at each sampling time, n: the number of sampling during a half cycle time of the AC power source 1.

As described above, the conventional resistance welder 50 employs a system for feeding back the current I flowing through the primary winding of the welding transformer 3 to control the current I such that it is constant. In the case of the resistance welder 50 shown in FIG. 1, there are provided two secondary circuits 5 and 5A. Therefore when one of them, such as the secondary circuit 5, is disconnected, a current whose value is two times that of the usual value flows through the secondary circuit 5A.

If the current of two times the standard value flows through the welding portion of the secondary circuit, sometimes problems such as the burning of a hole or the like in the welding portion, may occur. In this case the manufacture to be welded becomes inferior and must be excluded from the manufacturing process. The welding portion corresponding to the disconnected secondary circuit is of course not welded, but can be rewelded at a later time and thus can be recovered.

For example, in an automobile manufacturing industry, inferior goods produced by excessive welding occur in a process for welding a car body and the inferior goods must be removed from the assembly process thereby adversely affecting the following assembly process. Therefore even in the case where one of the secondary circuits is disconnected, it is necessary that normal welding can be executed at the other secondary circuit.

SUMMARY OF THE INVENTION

Accordingly, one object of this invention is to provide a novel resistance welder and a novel control device thereof which, even in the case where one or more secondary circuits thereof are disconnected, can weld normally at the other secondary circuits.

Another object of this invention is to provide a novel resistance welder and a novel control device which can be controlled simply.

Still another object of this invention is to provide a novel resistance welder and a novel control device which can set reference values for the welding and which can change them easily.

These and other objects of this invention can be achieved by providing a resistance welder including an electronic contactor, a welding transformer connected in series with the electronic contactor and having a secondary circuit with a welding portion connected to the welding transformer. The series circuit of the electronic contactor and the welding transformer is adapted for connection to an AC power source. The resistance welder also includes a voltage detector connected to detect a voltage acorss the electronic contactor for producing a first signal according to the detected voltage, a delay circuit connected to receive a primary voltage for delaying the primary voltage by a value determined by a first time constant thereof to produce a voltage signal, a switch connected to receive the first signal for resetting the delay circuit according to the first signal, and a gain control circuit connected to receive the voltage signal for controlling a transmission gain of the voltage signal to produce a gain controlled signal. The resistance welder further includes a processor connected to receive the gain controlled signal for comparing the gain controlled signal with a predetermined reference value and for producing a gate control signal based on a comparison result. The electronic contactor is also connected to receive the gate control signal for controlling the primary voltage so that the primary voltage becomes equal to a predetermined value corresponding to the predetermined reference value.

These and other objects of this invention can further be achieved by providing a control device for a resistance welder including an electronic contactor, a welding transformer connected in series with the electronic contactor, and a secondary circuit with a welding portion connected to the welding transformer wherein a series connected circuit of the electronic contactor and the welding transformer is adapted for connection to an AC power source. The control device includes a voltage detector connected to detect a voltage across the electronic contactor for producing a first signal according to the detected voltage, a delay circuit connected to receive a primary voltage for delaying the primary voltage by a value determined by a first time constant thereof to produce a voltage signal, a switch connected to receive the first signal for resetting the delay circuit according to the first signal, and a gain control circuit connected to receive the voltage signal for controlling a transmission gain of the voltage signal to produce a gain controlled signal. The control device further includes a processor connected to receive the gain controlled signal for comparing the gain controlled signal with a predetermined reference value and for producing a gate control signal based on a comparison result. The electronic contactor is also connected to receive the gate control signal for controlling the primary voltage so that the primary voltage becomes equal to a predetermined value corresponding to the predetermined reference value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
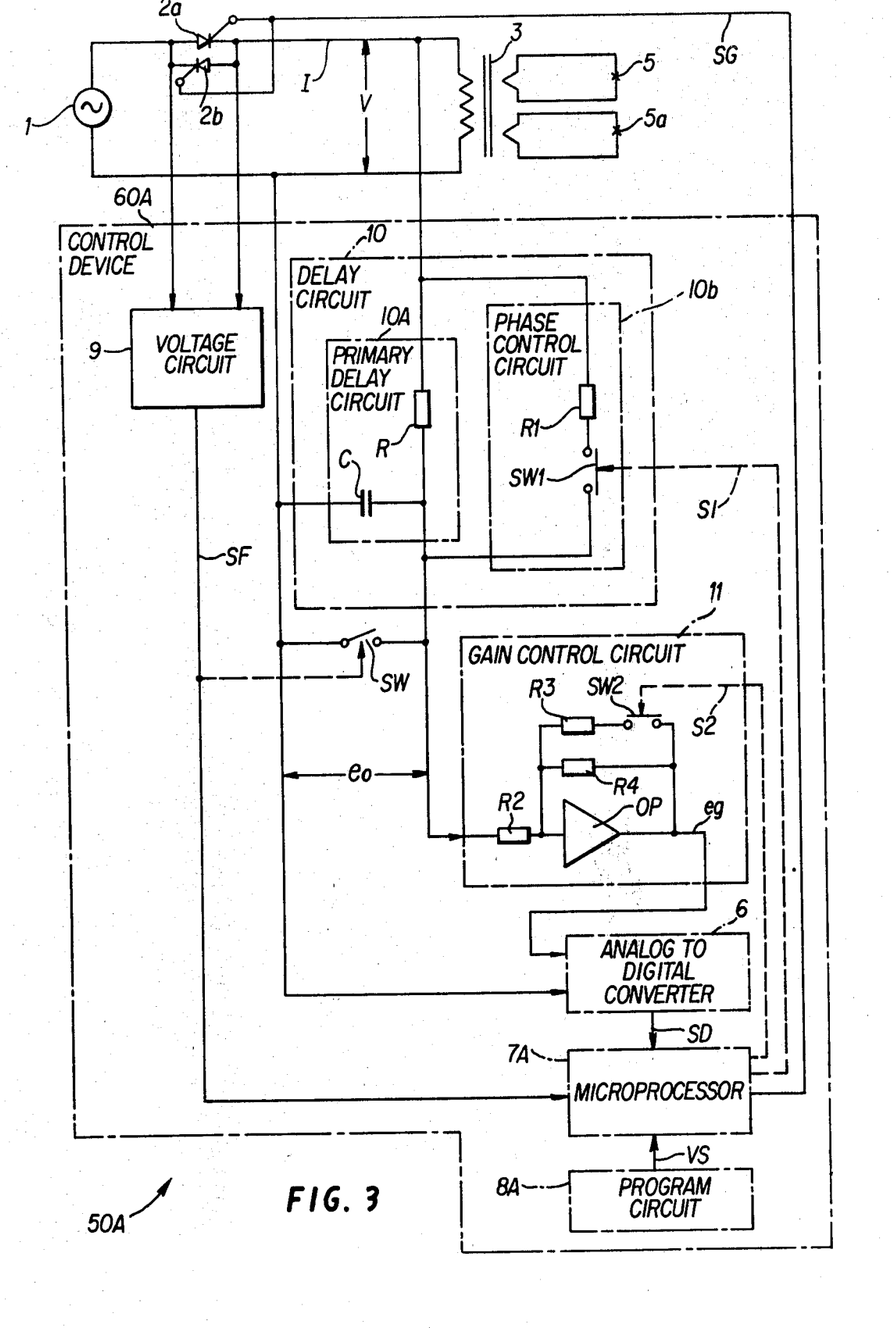
FIG. 3 is a circuit diagram of a resistance welder according to a preferred embodiment of this invention.

Referring now to the drawings, wherein like reference numerals and letters designate identical or corresponding parts throughout the several views, and more particularly to FIG. 3 thereof, wherein one preferred embodiment of the invention is shown, reference numeral 1 is the AC power source and 50A is a resistance welder. The resistance welder includes the anti-parallel connected electronic contactors, such as the thyristors 2a and 2b, the welding transformer 3, and the secondary circuits 5 and 5A of the welding transformer 3. The resistance welder 50A also includes a control device 60A which includes the AD converter 6, a microprocessor 7A, a program circuit 8A, a voltage detector 9, a delay circuit 10, a switch SW, and a gain control circuit 11.

The delay circuit 10 is connected in parallel with the welding transformer 3 to detect a primary voltage V across the welding transformer 3, which includes a primary delay circuit 10A and a phase control circuit 10B. The voltage detector 9 detects voltages across both terminals of the thyristors 2a and 2b and applies the detected signal to control the switch SW and to the microprocessor 7A as a first signal SF. The first signal SF is determined as follows: When the thyristors 2a and 2b are in the OFF state, the first signal SF is "1" and when one of the thyristors 2a or 2b is in the ON state, the first signal SF is "0". For example the voltage detector 9 can be implemented with a photo coupler Schmitt trigger circuit which produces the first signal SF ("1" or "0") when the detected voltage across both terminals of the thyristors 2a and 2b is more than or less than the voltage of between 2 and 4 times the forward drop of the thyristors 2a and 2b. The first signal SF thus produced in the voltage detector 9 is applied to control the switch SW and to the microprocessor 7A.

The primary delay circuit 10A is connected in parallel with the welding transformer 3 and includes a series connected capacitor C and a resistor R. The phase control circuit 10B is connected in parallel with the resistor R and includes a series connected resistor R1 and a switch SW1. The switch SW1 is controlled to open or close by a first control signal S1 of the microprocessor 7A, which will be described later in detail.

The phase angle $\phi$ of the delay circuit 10 is as follows: When the switch SW1 is open, $$\phi = \tan^{-1} CR\omega$$

When the switch SW1 is closed $$\phi = \tan^{-1} \frac{C \cdot R \cdot R1}{R + R1} \times \omega$$

Where; $\omega$ is an angular frequency of the AC power source 1.

The switch SW is coupled in parallel with the capacitor C. The switch SW is constructed with semiconductor elements, such as field effect transistors. The switch SW is opened when one of the thyristors 2a or 2b is in the ON state and closed when the thyristors 2a and 2b are in the OFF state based on the first signal SF of the voltage detector 9. The gain control circuit 11 includes a series connected resistor R2 and an operational amplifier OP. It also includes a resistor R4 and a series connected resistor R3 and a switch SW2, both circuits being connected in parallel with the operational amplifier OP.

The output terminal of the delay circuit 10, which is the connection point of the resistor R and the capacitor C, is connected to the input terminal of the gain control circuit 11 which is the open end of the resistor R2. The output terminal of the gain control circuit 11, which is the output terminal of the operational amplifier OP, is connected to the A/D converter 6.

The switch SW2 is controlled to open or close by a second control signal S2 of the microprocessor 7A, which will be described later in detail. The transmission gain of the gain control circuit 11 is R4/R2 when the switch SW2 is open, and is $$\frac{R_3 \cdot R_4}{R_2(R_3 + R_4)}$$

when the switch SW2 is closed.

In the resistance welder 50A described above, the voltage applied across the primary winding of the welding transformer 3 is delayed in the delay circuit 10. The delayed output voltage signal $e_o$ is applied to the gain control circuit 11 which produces a gain controlled signal $e_g$ after controlling the transmission gain of the voltage signal $e_o$. The gain controlled signal $e_g$ is applied to the A/D converter 6 and is converted into a digital signal SD. The digital signal SD thus converted is then fed back to the microprocessor 7A.

Figure 4:
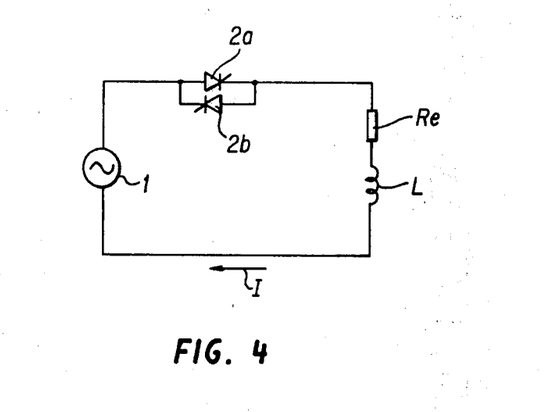
FIG. 4 is an equivalent circuit of the resistance welder shown in FIG. 1 or FIG. 3.

An equivalent circuit of the main part of the resistance welder 50 or 50A can be shown as a series circuit of the AC power source 1, the thyristors 2a and 2b, a resistor Re, and a reactance L as shown in FIG. 4. The resistance Re and the reactance L are the equivalent values of the welding transformer 3 including the secondary circuits 5 and 5A connected to the secondary winding thereof. In FIG. 4, if it is assumed that the voltage of the AC power source 1 is E sin $\omega t$, a power factor angle $\phi_e$ of the equivalent circuit is $\tan^{-1} \omega L/R_e$, and a firing angle of the thyristors 2a and 2b is $\theta$, the current I flowing through the equivalent circuit (which is also the primary current of the welding transformer 3) is obtained as follows:

$$I = \frac{E}{\sqrt{R_e^2 + \omega^2 L^2}} \{\sin(\omega t + \theta - \phi_e) - e^{-(t/T_{oe})} \times \sin(\theta - \phi_e)\} \quad (1)$$

where, $T_{oe} = \tan \phi_e/\omega$

Next, in the resistance welder 50A shown in FIG. 3, before the thyristors 2a and 2b are fired the capacitor C is shorted by the switch SW, and at the same time as the firing of the thyristors 2a and 2b the switch SW is opened. If it is assumed that the voltage of the AC power source 1 is E sin $\omega t$, the firing angle of the thyristors 2a and 2b is $\theta$, and the phase control angle of the delay circuit 10 is $\phi$, the voltage $e_o$ across the capacitor C is obtained as follows:

$$e_o = \frac{E}{\sqrt{R^2 + \frac{1}{\omega^2 C^2}}} \{\sin(\omega t + \theta - \phi) - e^{-(t/T_o)} \times \sin(\theta - \phi)\} \quad (2)$$

where, $T_o = \tan \phi/\omega$

According to the equations (1) and (2), it is understood that when $\phi_e = \phi$, namely $L/R_e$ is equal to the time constant of the delay circuit 10 and the voltage $e_o$ is proportional to the current I. In FIG. 1 the current I is detected by the current transformer 4 and then fed back to the microprocessor 7 via the A/D converter 6, while in FIG. 3 the voltage $e_o$ is fed back to the microprocessor 7A via the gain control circuit 11 and the A/D converter 6. Therefore the resistance welder 50A can produce the same control as the resistance welder 50 does by making the time constant (hereinafter referred to as the first time constant) of the delay circuit 10 equal to the time constant (hereinafter referred to as the second time constant) $L/R_e$ of the equivalent circuit shown in FIG. 4.

Next the program circuit 8A will be explained in detail. The program circuit 8A can set the voltage values corresponding to the voltage $e_o$ instead of setting the secondary currents as in the program circuit 8 of FIG. 1 and also it can set the weld time. The set values VS in the program circuit 8A are applied to the microprocessor 7A and are stored in a main memory (not shown) thereof. The microprocessor 7A calculates the reference voltage Vref corresponding to the voltage $e_o$ based on the data stored in the main memory. The microprocessor 7A compares the digital signal SD fed back through the gain control circuit 11 and the A/D converter 6 with the reference voltage Vref previously stored in the main memory digitally and produces a gate control signal SG for controlling the firing angle $\theta$ of the thyristors 2a and 2b to make the fed back voltage equal to the reference voltage Vref based on the comparison result at every cycle of the AC power source 1. The voltage values VS to be set in the program circuit 8A can be determined based on the result of previously executed experimentation which is apparent to those skilled in the art, so detailed description thereof will be neglected.

As described above, in the resistance welder 50A wherein the voltage $e_o$ is controlled to be constant, the waveform of the voltage $e_o$ is not affected by disconnection of the secondary circuits 5 and 5A of the welding transformer 3. Therefore in the case where one of the secondary circuits 5 and 5A is disconnected, overcurrent will not flow through the other secondary circuit.

As described above, it is necessary in the resistance welder 50A that the first time constant of the delay circuit 10 be set equal to the second time constant of the equivalent circuit shown in FIG. 4, namely L/Re. The power factor of the load (corresponding to the second time constant L/Re) is affected by exchanging the welding transformer 3 or by changing the length of the cable between the welding transformer 3 and the welding portion in the secondary circuits 5 and 5A. The power factor of the load can be determined as follows: At a first cycle Tf of every welding operation shown in FIG. 2, it is determined that the thyristors 2a and 2b are controlled to fire with a predetermined firing angle θ, for example 90° or 120°. When the welding current I flowing through the thyristors 2a and 2b during the first cycle Tf is cut off, the change of the thyristors 2a and 2b from the ON state to the OFF state is detected by the voltage detector 9. The output signal of the voltage detector 9, the first signal SF, is applied to the microprocessor 7A for interruption. Then the microprocessor 7A reads out a power factor from the table previously stored in the main memory based upon the interruption.

The power factor angle $\phi_e$ is obtained as follows: When the current I is zero, the equation (1) becomes:

$$\sin(\omega t + \theta - \phi_e) = e^{-(t/T_{oe})} \sin(\theta - \phi_e) \quad (3)$$

where, $\theta = 90°$ or $120°$ as described above.

By solving the equation (3), the power factor angle $\phi_e$ is obtained as a function of the time t. The power factor angles $\phi_e$ are calcuated corresponding to various times t and the list between the times t and the calculated power factor angles $\phi_e$ is previously stored in the table. The interruption signal SF is produced at the time ti when the current I becomes zero. Therefore, the microprocessor 7A can read out the power factor angle $\phi_e$ of the load from the table by the parameter of the time ti.

After obtaining the power factor angle $\phi_e$ of the load, the first time constant of the delay circuit 10 is to be compared with the second time constant L/Re of the load calculated from the power factor angle $\phi_e$. When the first time constant of the delay circuit 10 is not equal to the second time constant L/Re, it is necessary to control the phase control circuit 10B and the gain control circuit 11 such that the two time constants become equal to each other.

The power factor angle of the load in the resistance welder generally does not vary greatly so long as the same welding transformer is used. It is therefore sufficient for the delay circuit 10 to provide two time constants. For this purpose the phase control circuit 10B having the construction described above is provided in the resistance welder 50A shown in FIG. 3. The microprocessor 7A receives the second time constant L/Re of the present connected load, as described above, produces the first control signal S1 to make the first time constant of the delay circuit 10 near to the second time constant L/Re of the load which is applied to the switch SW1. The switch SW1 is controlled to open or close by the first control signal S1. The microprocessor 7A also produces the second control signal S2 for controlling a transmission gain of the gain control circuit 11 to adjust the amplitude of the voltage $e_o$ which is varied by phase control in the delay circuit 10 as described above. The switch SW2 is controlled to open or close by the second control signal S2.

Figure 5:
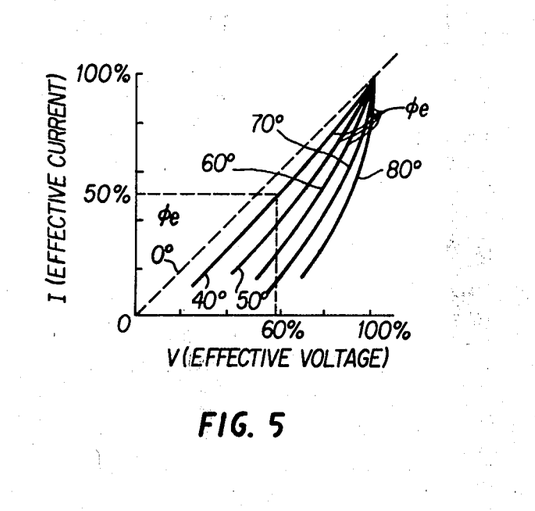
FIG. 5 is a graph showing the relationships between the voltage across the welding transformer and the primary current in FIG. 1 or FIG. 3.

Hereinafter, operation of the resistance welder 50A will be described in more detail. In FIG. 4, both the effective values of the voltage V and the current I of the load can be changed by changing the firing angle θ of the thyristors 2a and 2b. FIG. 5 shows the relationship between the effective voltage V and the effective current I where the power factor angle $\phi_e$ ($\phi_e$: $\tan^{-1} \omega L/Re$) is used as a parameter. When the power factor angle $\phi_e$ is zero, the reactance L of the load is zero. In FIG. 5, the 100 percent value of the effective voltage V or the effective current I is defined as the voltage or the current where the firing angle θ of the thyristors 2a and 2b is equal to the power factor angle $\phi_e$ of the load when the thyristors 2a and 2b are in the shorted state. In a general resistance welder, the phase control angle $\phi_e$ of the load is approximately between 40° and 80°. As is apparent in FIG. 5, the relationship between the effective voltage V and the effective current I is not linear. For example, the effective voltage value corresponding to 50 percent of the effective current I is 60 percent of the effective voltage V as determined by the curve of the predetermined power factor angle $\phi_e$. In a resistance welder it is necessary to control the current flowing between electrodes eventually even in the case where a constant voltage control technique is employed therein, because heat generated at the welding portion is due to Joule heating ($= i^2 \gamma$, where i is the current flowing through the welding portion, and $\gamma$ is the resistance of the welding portion). Even in the case where a constant voltage control technique is employed in the resistance welder wherein a target reference voltage value is set by the program circuit, it is easy to insure that the current I changes proportionally to the changing of the set voltage values. For example, if the set voltage values change from 50 percent to 100 percent, then the current I also changes from 50 percent to 100 percent.

The resistance welder 50A shown in FIG. 3 has the same function by feeding back the voltage signal $e_o$ to the microprocessor 7A, as a system where the percentages of the reference current values are set and the percentages of the voltages corresponding to the reference current values are obtained using the curve in FIG. 5 and the thus obtained voltage values are stored in the main memory of the microprocessor 7A for the reference voltage Vref. Namely the waveform of the voltage $e_o$ is analogous to the primary current I, even if a constant voltage control technique is employed. Therefore it is not necessary to obtain the reference voltage Vref using the relations shown in FIG. 5, which is described above.

As described above this invention can provide a novel resistance welder and a novel control device thereof which, in the case where one or more secondary circuits thereof are disconnected, can weld normally at the other secondary circuits without causing excessive current to flow therethrough.

Since the instantaneous value of the equivalent voltage $e_o$ to be fed back to the microprocessor 7A is proportional to (the waveform of) the primary current I, execution in the microprocessor 7A is very simple because changes in the primary current are executed by multiplying the fed back equivalent voltage by a proportion constant.

This invention employs a constant voltage control of the load, though it is very simple to change the set value because the set value can be determined proportionally to the effective load current.

This invention is not restricted to this embodiment. In FIG. 3, the delay circuit 10 is connected in parallel with the welding transformer 3 to detect the voltage V across the welding transformer 3; however, the delay circuit 10 may be connected in parallel with the AC power source 1 instead. In this case, since the capacitor C is reset by the switch SW, it is always shorted when the thyristors 2a and 2b are in the OFF state, thereby preventing the load current portion from being applied to the A/D converter 6.

In FIG. 3, the delay circuit 10 may be constructed by a series connected circuit of a capacitor and a variable resistor. The resistance value of the variable resistor may be controlled continuously or discretely by a first control signal S1 of the microprocessor 7A to make the first time constant of the delay circuit 10 equal to the second time constant of the load. In this case adjustment of the first time constant of the delay circuit 10 can be made more precisely.

In a simplified type of a resistance welder, the phase control circuit 10B may be eliminated, wherein the first time constant of the delay circuit 10 is a constant, namely CR.

In FIG. 3 the gain control circuit 11 includes the resistor R3, the resistor R4 and the switch SW2, but it may include a variable resistor in place of them. The resistance value of the variable resistor may be controlled continuously or discretely by a second control signal S2 of the microprocessor 7A to adjust the amplitude of the voltage $e_o$. In this case adjustment of the voltage $e_o$ can be made more precisely. In a simplified type of a resistance welder, the resistor R3 and the switch SW2 may be eliminated wherein the transmission gain of the gain control circuit 11 is R4/R2.

Moreover this invention can provide a resistance welder wherein when the number of secondary circuits is one, a constant current control technique is employed, and wherein when two or more secondary circuits are utilized a constant voltage control technique, according to this invention, is employed.

Further, the delay circuit may be constructed with a resistor and a reactance or with an operational amplifier, as is apparent to those skilled in the art.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A resistance welder, comprising:
    said electronic contactor means further including means coupled to receive said gate control signal for controlling an output voltage thereof appearing across said primary winding of said transformer means such that said output voltage becomes equal to a predetermined value corresponding to said predetermined reference value.

2. The resistance welder as recited in claim 1, wherein said delaying means includes:
    voltage detector means coupled to detect a voltage appearing across said electronic contactor means for producing a first signal according to said detected voltage, said first signal indicating whether said electronic contactor means is in the ON state or not;
    delay circuit means; and
    switch means coupled to receive said first signal for resetting said delay circuit means when said first signal indicates said electronic conductor means is not in the ON state;
    said delay circuit means being coupled to receive said primary voltage for delaying said primary voltage by said first time constant thereof only when said electronic contactor means is in the ON state to produce said delayed voltage signal.

3. The resistance welder as recited in claim 2, wherein:
    said processor means further includes means coupled to receive said first signal, means for detecting said second time constant of said circuit of said transformer means and said secondary circuit based on a time when said first signal is received, means for producing a first control signal to make said first time constant equal to said second time constant, and means for producing a second control signal to control said transmission gain;
    said delay circuit means further includes means coupled to receive said first control signal for changing said first time constant according to said first control signal; and
    said gain control means further includes means coupled to receive said second control signal for changing said transmission gain according to said second control signal.

4. The resistance welder as recited in claim 2 or claim 3, wherein:
    said delay circuit means is coupled in parallel with said primary winding of said transformer means to detect said primary voltage.

5. The resistance welder as recited in claim 2 or claim 3, wherein:
    said delay circuit means is coupled in parallel with said series circuit of said electronic contactor means and said primary winding of said transformer means to detect said primary voltage.

6. The resistance welder as recited in claim 2, or claim 3, wherein:
    said secondary circuit includes a plurality of circuits, each circuit including a welding load.

7. The resistance welder as recited in claim 2, further comprising:
    analog to digital converter means coupled to receive said gain controlled signal for converting with gain controlled signal into a digital signal, said digital signal being applied to said processor means.

8. The resistance welder as recited in claim 3, further comprising:
    analog to digital converter means coupled to receive said gain controlled signal for converting said gain controlled signal into a digital signal, said digital signal being applied to said processor means.

9. The resistance welder as recited in claim 7 or claim 8, wherein:
    said electronic contactor means includes a thyristor.

10. The resistance welder as recited in claim 7 or claim 8, wherein:
    said electronic contactor means includes two antiparallel coupled thyristors.

11. The resistance welder as recited in claim 7 or claim 8, wherein:
    said first signal produced by said voltage detector means is a logic 1 when said voltage detected by said voltage detector means is greater than a predetermined level; and
    said first signal produced by said voltage detector means is a logic 0 when said voltage detected by said voltage detector means is less than said predetermined level.

12. The resistance welder as recited in claim 11, wherein:

said voltage detector means includes a photo coupler Schmitt trigger circuit.

13. The resistance welder as recited in claim 7 or claim 8, further comprising:
program means for setting a reference value, said processor means being coupled to receive said reference value as said predetermined reference value.

14. The resistance welder as recited in claim 7, wherein:
said delay circuit means includes a series connected circuit of a resistor and a capacitor, and produces a voltage across said capacitor as said delayed voltage signal.

15. The resistance welder as recited in claim 8, wherein:
said delay circuit means includes a series connected circuit of a variable resistor and a capacitor, and produces a voltage across said capacitor as said delayed voltage signal; and
said variable resistor is controlled by said first control signal.

16. The resistance welder as recited in claim 8, wherein:
said delay circuit means includes a series connected circuit of a first resistor and a capacitor, and a series connected circuit of a second resistor and a first switch coupled in parallel with said first resistor, said first switch being controlled by said first control signal, said delay circuit means producing a voltage across said capacitor as said delayed voltage signal.

17. The resistance welder as recited in claim 8, wherein:
said gain control circuit means includes a series connected circuit of a third resistor and an operational amplifier, and a variable resistor coupled in parallel with said operational amplifier, said variable resistor being controlled by said second control signal.

18. The resistance welder as recited in claim 8, wherein:
said gain control circuit means includes a series connected circuit of a third resistor and an operational amplifier, a fourth resistor coupled in parallel with said operational amplifier, and a series connected circuit of a fifth resistor and a second switch coupled in parallel with said operational amplifier, said second switch being controlled by said second control signal.

19. The resistance welder as recited in claim 14, 15 or 16, wherein:
said switch means is coupled in parallel with said capacitor.

20. The resistance welder as recited in claim 7, wherein:
said gain control circuit means includes a series connected circuit of a third resistor and an operational amplifier, and a fourth resistor coupled in parallel with said operational amplifier.

21. A control device for a resistance welder including electronic contactor means, transformer means including a primary winding coupled in series with said electronic contactor means, the series circuit of said electronic contactor means and said primary winding of said transformer means being adapted to receive power from an AC power source, and a secondary circuit including a welding load coupled to a secondary winding of said transformer means, comprising:

delaying means coupled to receive a primary voltage appearing across one of said primary winding of said transformer means and said series circuit for delaying said primary voltage by a first time constant thereof only when said electronic contactor means is in the ON state to produce a delayed voltage signal, said first time constant being equal to a second time constant of a circuit of said transformer means and said secondary circuit;
gain control means coupled to receive said delayed voltage signal for controlling a transmission gain of said delayed voltage signal to produce a gain controlled signal; and
processor means coupled to receive said gain controlled signal for comparing said gain controlled signal with a predetermined reference value and for producing a gate control signal based on a the comparing of said gain controlled signal and said predetermined reference value;
said electronic contactor means further including means coupled to receive said gate control signal for controlling an output voltage thereof appearing across said primary winding of said transformer means such that said output voltage becomes equal to a predetermined value corresponding to said predetermined reference value.

22. The control device as recited in claim 21, wherein said delay means includes:
voltage detector means coupled to detect a voltage appearing across said electronic contactor means for producing a first signal according to said detected voltage, said first signal indicating whether said electronic contactor means is in the ON state or note;
delay circuit means; and
switch means coupled to receive said first signal for resetting said delay circuit means when said first signal indicates said electronic contactor means is not in the ON state;
said delay circuit means being coupled to receive said primary voltage for delaying said primary voltage by said first time constant thereof only when said electronic contactor means is in the ON state to produce said delayed voltage signal.

23. The control device as recited in claim 22, wherein:
said processor means further includes means coupled to receive said first signal, means for detecting said second time constant of said circuit of said transformer means and said secondary circuit based on a time when said first signal is received, means for producing a first control signal to make said first time constant equal to said second time constant, and means for producing a second control signal to control said transmission gain;
said delay circuit means further includes means coupled to receive said first control signal for changing said first time constant according to said first control signal; and
said gain control means further includes means coupled to receive said second control signal for changing said transmission gain according to said second control signal.

24. The control device as recited in claim 23, further comprising:
analog to digital converter means coupled to receive said gain controlled signal for converting said gain controlled signal into a digital signal; and program means for setting a reference value;

wherein said processor means is coupled to receive said digital signal and is coupled to receive said reference value as said predetermined reference value;

wherein said delay circuit means is coupled in parallel with said primary winding of said transformer means to detect said primary voltage, said delay circuit means including a series circuit of a first resistor and a capacitor, and a series circuit of a second resistor and a first switch connected in parallel with said first resistor, said delay circuit means producing a voltage across said capacitor as said delayed voltage signal, said first switch being controlled by said first control signal;

wherein said switch means is coupled in parallel with said capacitor;

wherein said gain control circuit means includes a series connected circuit of a third resistor and an operational amplifier, a fourth resistor coupled in parallel with said operational amplifier, and a series connected circuit of a fifth resistor and a second switch coupled in parallel with said operational amplifier, said second switch being controlled by said second control signal.

* * * * *

UNITED STATES PATENT AND TRADEMARK OFFICE
CERTIFICATE OF CORRECTION

PATENT NO. : 4,419,559

DATED : DECEMBER 6, 1983

INVENTOR(S) : IZUME ET AL.

It is certified that error appears in the above-identified patent and that said Letters Patent is hereby corrected as shown below:

Claim 1, line 1, after "comprising:" insert

--electronic contactor means;

transformer means including a primary winding coupled in series with said electronic contactor means to form a series circuit, said series circuit being adapted to receive power from an AC power source;

a secondary circuit including at least one welding load coupled to at least one secondary winding of said transformer means;

delaying means coupled to receive a primary voltage appearing across one of said primary winding of said transformer means and said series circuit for delaying said primary voltage by a first time constant thereof only when said electronic contactor means is in the ON state to produce a delayed voltage signal, said first time constant being equal to a second time constant of a circuit of said transformer means and said secondary circuit;

gain control means coupled to receive said delayed voltage signal for controlling a transmission gain of said delayed voltage signal to produce a gain controlled signal; and

UNITED STATES PATENT AND TRADEMARK OFFICE
CERTIFICATE OF CORRECTION

PATENT NO. : 4,419,559

DATED : DECEMBER 6, 1983

INVENTOR(S) : IZUME ET AL

It is certified that error appears in the above-identified patent and that said Letters Patent is hereby corrected as shown below:

processor means coupled to receive said gain controlled signal for comparing said gain controlled signal with a predetermined reference value and for producing a gate control signal based on the comparing of the gain controlled signal and the predetermined reference value;--

Claim 7, column 10, line 41, change "with" to --said--.

Claim 21, column 12, line 17 delete "a" (second occurrence).

Claim 22, column 12, line 34, change "note" to --not--.

Signed and Sealed this

Seventeenth Day of May, 1988

Attest:

DONALD J. QUIGG

*Attesting Officer*  *Commissioner of Patents and Trademarks*